US006168046B1

(12) United States Patent
Galesi

(10) Patent No.: US 6,168,046 B1
(45) Date of Patent: Jan. 2, 2001

(54) VITAMIN AND PILL DISPENSING DEVICE

(76) Inventor: Morris Galesi, 39 Beverly Dr., Bernardsville, NJ (US) 07924

( * ) Notice: Under 35 U.S.C. 154(b), the term of this patent shall be extended for 0 days.

(21) Appl. No.: 09/220,196

(22) Filed: Dec. 23, 1998

(51) Int. Cl.[7] .............................. B65G 59/00; B65H 3/00; G07F 11/16

(52) U.S. Cl. ............................ 221/251; 221/94; 221/106; 221/133; 221/196

(58) Field of Search .................................. 221/94, 98, 99, 221/106, 251, 263, 270, 133, 196, 264

(56) References Cited

U.S. PATENT DOCUMENTS

| | | | | |
|---|---|---|---|---|
| 359,523 | * | 3/1887 | Townsley | 221/124 X |
| 2,789,727 | * | 4/1957 | Singleton | 221/124 |
| 3,343,553 | * | 9/1967 | Whitmore | 221/124 X |
| 3,556,342 | * | 1/1971 | Guarr | 221/124 X |
| 3,963,456 | * | 6/1976 | Tsuchiya et al. | 221/264 X |
| 4,101,284 | * | 7/1978 | Difiglio et al. | 221/264 X |
| 4,288,006 | | 9/1981 | Clover | 222/42 |
| 4,763,812 | * | 8/1988 | Sekinoo et al. | 221/264 X |
| 4,775,077 | | 10/1988 | Capotorto | 221/131 |
| 4,807,757 | | 2/1989 | Rappaport | 206/535 |
| 5,148,944 | * | 9/1992 | Kaufman et al. | 221/264 X |
| 5,667,096 | * | 9/1997 | Wu | 221/6 X |

* cited by examiner

*Primary Examiner*—Christopher P. Ellis
*Assistant Examiner*—Gene O. Crawford
(74) *Attorney, Agent, or Firm*—Goldstein & Canino

(57) ABSTRACT

A vitamin and pill dispensing device including a housing having an upper portion, a lower portion, and an intermediate portion therebetween. The upper portion has an open upper end, a closed lower end, a front face, a rear face, and a pair of opposed side walls. The upper portion has a plurality of divider panels extending between the closed lower end and the open upper end in a spaced relationship thereby separating the upper portion into a plurality of compartments. The closed lower end has a plurality of apertures therethrough whereby each aperture is disposed within one of each of the compartments. The intermediate portion has an inverted frustoconical configuration defined by an open upper end and an open lower end. The open upper end of the intermediate portion is integral with the closed lower end of the upper portion. The lower portion has an open upper end and an open lower end. The open upper end of the lower portion is integral with the open lower end of the intermediate portion. The open lower end of the lower portion serves as a dispensing opening. A plurality of release mechanisms couple with the plurality of compartments of the upper portion of the housing.

6 Claims, 2 Drawing Sheets

FIG 1
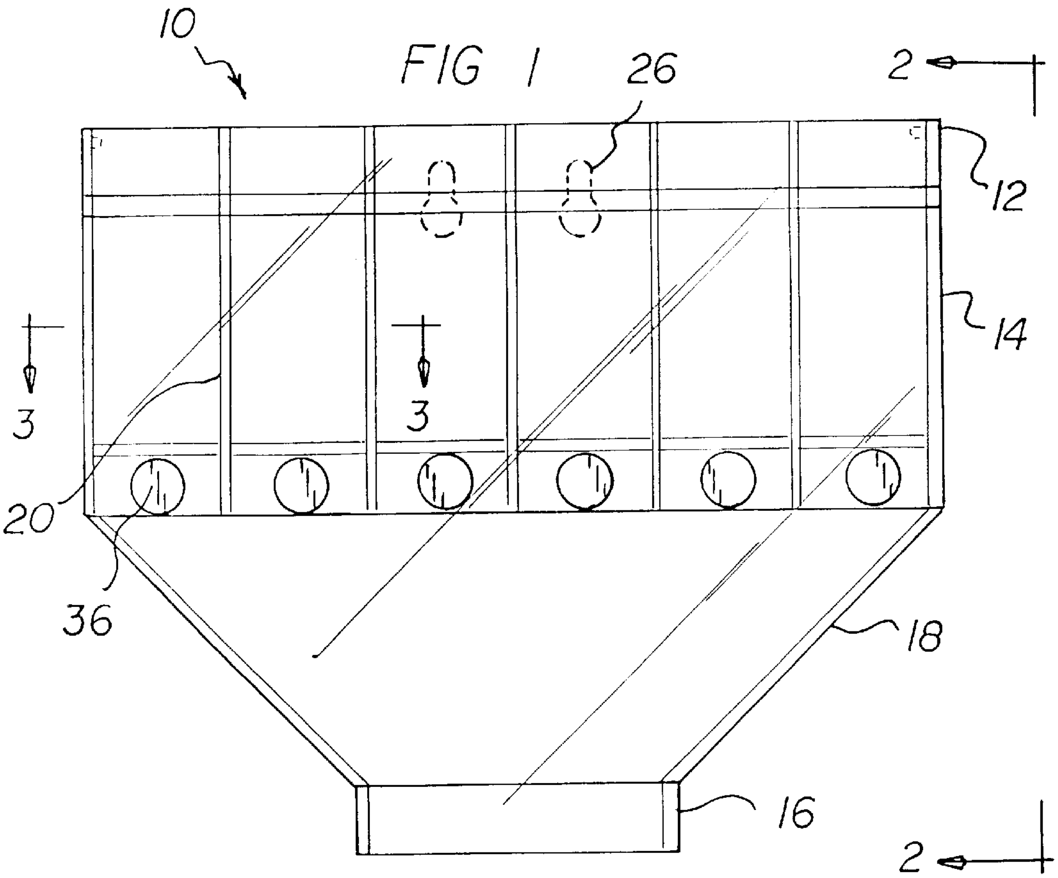
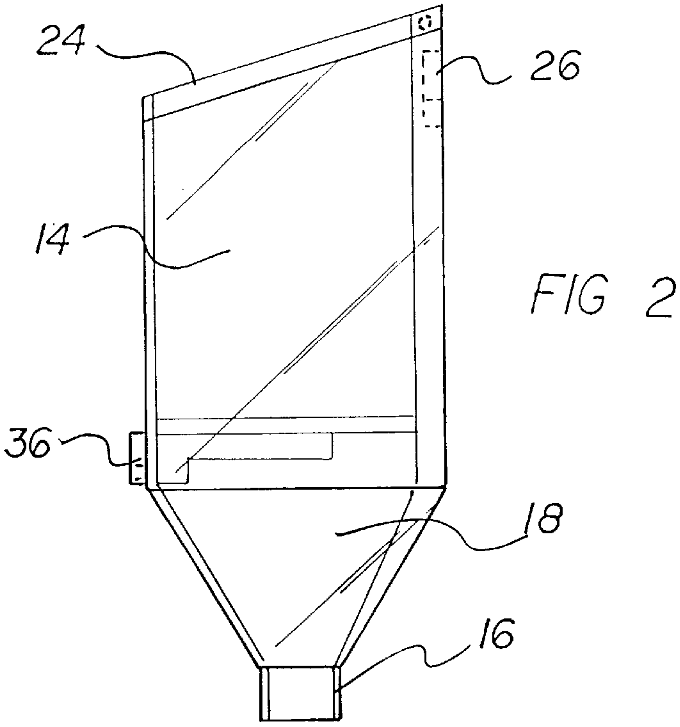
FIG 2

VITAMIN AND PILL DISPENSING DEVICE

BACKGROUND OF THE INVENTION

The present invention relates to a vitamin and pill dispensing device and more particularly pertains to dispensing a predetermined quantity of vitamins and pills.

The use of vitamins and therapeutic pills has increased significantly the past years. With this increase in use, there has grown a need to have a pill storage device which may be conveniently used by an individual as a dispenser of pills. Typically, the individual will be using several different vitamins or pills, requiring a multi-compartment device that is easy to use at home or take on the road. An essential requisite of a pill dispenser is the ability from trouble free dispensing of the pills as well as the convenient refilling of the compartments. Furthermore, it is desirable that the container be as airtight as possible in order to preserve the freshness of the pills located in the compartments as much as possible. As such, there appears to be some need for a simple and easy to use vitamin and pill dispenser which can be utilized in a home environment, and in this respect, the present invention addresses this need.

The use of dispensing assemblies is known in the prior art. More specifically, dispensing assemblies heretofore devised and utilized for the purpose of dispensing objects are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,775,077 to Capotorto discloses a vitamin dispenser capable of holding different types of vitamins in a plurality of slots with a series of release lever. The Capotorto device appears to release a single pill when depressed. U.S. Pat. No. 4,807,757 to Rappaport discloses a portable multi-side pill dispenser for releasing pills one at a time. U.S. Pat. No. 4,288,006 to Clover, Jr. discloses a multi-compartment pill dispenser.

While these devices fulfill their respective, particular objective and requirements, the aforementioned patents do not describe a vitamin and pill dispensing device for dispensing a predetermined quantity of vitamins and pills.

In this respect, the vitamin and pill dispensing device according to the present invention substantially departs from the conventional concepts and designs of the prior art, and in doing so provides an apparatus primarily developed for the purpose of dispensing a predetermined quantity of various sized and shaped vitamins and pills.

Therefore, it can be appreciated that there exists a continuing need for new and improved vitamin and pill dispensing device which can be used for dispensing a predetermined quantity of vitamins and pills. In this regard, the present invention substantially fulfills this need.

SUMMARY OF THE INVENTION

In the view of the foregoing disadvantages inherent in the known types of dispensing assemblies now present in the prior art, the present invention provides an improved vitamin and pill dispensing device. As such, the general purpose of the present invention, which will be described subsequently in greater detail, is to provide a new and improved vitamin and pill dispensing device and method which has all the advantages of the prior art and none of the disadvantages.

To attain this, the present invention essentially comprises a housing having an upper portion, a lower portion, and an intermediate portion therebetween. The upper portion has an open upper end, a closed lower end, a front face, a rear face, and a pair of opposed side walls. The upper portion has a plurality of divider panels extending between the closed lower end and the open upper end in a spaced relationship thereby separating the upper portion into a plurality of compartments. The closed lower end has a plurality of apertures therethrough whereby each aperture is disposed within one of each of the compartments. The open upper end has a cover member hingedly coupled thereto. The rear face has a pair of slotted apertures therethrough to facilitate securement of the housing a wall area. The intermediate portion has an inverted frustoconical configuration defined by an open upper end and an open lower end. The open upper end of the intermediate portion is integral with the closed lower end of the upper portion. The lower portion has an open upper end and an open lower end. The open upper end of the lower portion is integral with the open lower end of the intermediate portion. The open lower end of the lower portion serves as a dispensing opening. A plurality of release mechanisms couple with the plurality of compartments of the upper portion of the housing. Each of the release mechanisms include a sliding panel extending inwardly of the upper portion immediately above the apertures in the closed lower end. Each of the panels have a spring secured to an interior end thereof whereby the spring urges the sliding panel outwardly with respect to the housing. Each of the panels have an aperture therethrough for selectively aligning with the apertures of the compartments when the panels are pushed inwardly of the housing. Each of the sliding panels have a handle disposed on an exterior end thereof. A plurality of inserts are positionable within the plurality of compartments of the housing above the sliding panels. The inserts have apertures of various sizes and shapes therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vitamin and pill dispensing device which has all the advantages of the prior art dispensing assemblies and none of the disadvantages.

It is another object of the present invention to provide a new and improved vitamin and pill dispensing device which may be easily and efficiently manufactured and marketed.

It is a further object of the present invention to provide a new and improved vitamin and pill dispensing device which is of durable and reliable construction.

An even further object of the present invention is to provide a new and improved vitamin and pill dispensing device which is susceptible of a low cost of manufacture with regard to both materials and labor, and which accordingly is then susceptible of low prices of sale to the consuming public, thereby making such a vitamin and pill dispensing device economically available to the buying public.

Even still another object of the present invention is to provide a new and improved vitamin and pill dispensing device for dispensing a predetermined quantity of vitamins and pills.

Lastly, it is an object of the present invention to provide a new and improved vitamin and pill dispensing device including a housing having an upper portion, a lower portion, and an intermediate portion therebetween. The upper portion has an open upper end, a closed lower end, a front face, a rear face, and a pair of opposed side walls. The upper portion has a plurality of divider panels extending between the closed lower end and the open upper end in a spaced relationship thereby separating the upper portion into a plurality of compartments. The closed lower end has a plurality of apertures therethrough whereby each aperture is disposed within one of each of the compartments. The intermediate portion has an inverted frustoconical configuration defined by an open upper end and an open lower end. The open upper end of the intermediate portion is integral with the closed lower end of the upper portion. The lower portion has an open upper end and an open lower end. The open upper end of the lower portion is integral with the open lower end of the intermediate portion. The open lower end of the lower portion serves as a dispensing opening. A plurality of release mechanisms couple with the plurality of compartments of the upper portion of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the vitamin and pill dispensing device constructed in accordance with the principles of the present invention.

FIG. 2 is a side view of the present invention as taken along line 2—2 of FIG. 1.

The same reference numerals refer to the same parts through the various figures.

DESCRIPTION OF THE PREFERRED EMBODIMENT

Figure 3:
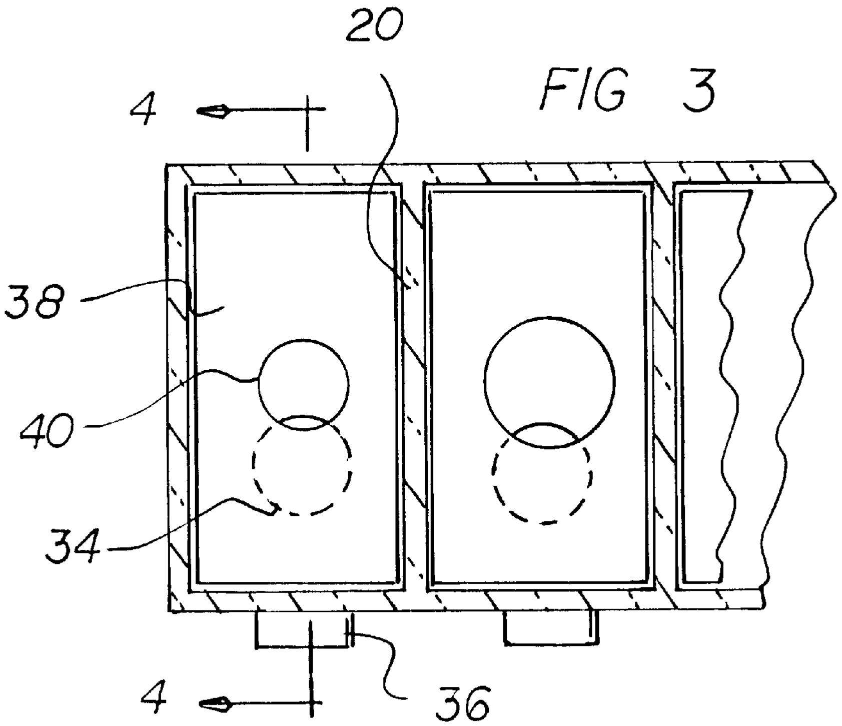
FIG. 3 is a cross-sectional view of the present invention as taken along line 3—3 of FIG. 1.
Figure 4:
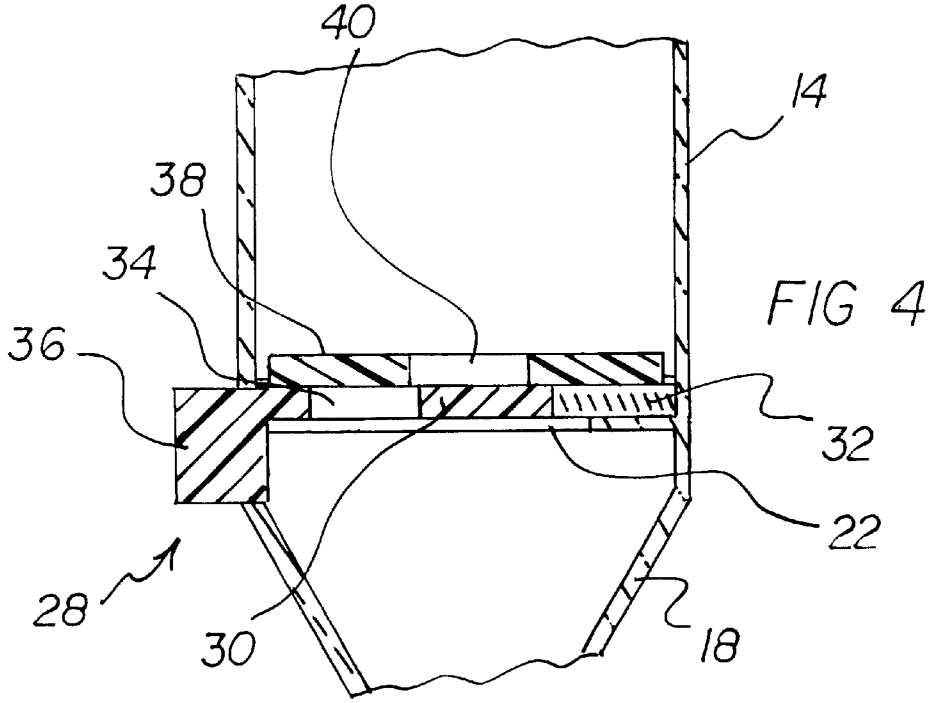
FIG. 4 is a cross-sectional view of the present invention as taken along line 4—4 of FIG. 3.

With reference now to the drawings, and in particular, to FIGS. 1 through 4 thereof, the preferred embodiment of the new and improved vitamin and pill dispensing device embodying the principles and concepts of the present invention and generally designated by the reference number 10 will be described.

Specifically, it will be noted in the various Figures that the device relates to a vitamin and pill dispensing device for dispensing a predetermined quantity of vitamins and pills. In its broadest context, the device consists of a housing, a plurality of release mechanisms, and a plurality of inserts. Such components are individually configured and correlated with respect to each other so as to attain the desired objective.

The housing 12 has an upper portion 14, a lower portion 16, and an intermediate portion 18 therebetween. The upper portion 14 has an open upper end, a closed lower end, a front face, a rear face, and a pair of opposed side walls. The upper portion 14 has a plurality of divider panels 20 extending between the closed lower end and the open upper end in a spaced relationship thereby separating the upper portion 14 into a plurality of compartments. The plurality of compartments are adapted to hold a plurality of pills therein. The closed lower end has a plurality of apertures 22 therethrough whereby each aperture 22 is disposed within one of each of the compartments. The open upper end has a cover member 24 hingedly coupled thereto. The rear face has a pair of slotted apertures 26 therethrough to facilitate securement of the housing 12 a wall area. The intermediate portion 18 has an inverted frustoconical configuration defined by an open upper end and an open lower end. The open upper end of the intermediate portion 18 is integral with the closed lower end of the upper portion 14. The lower portion 16 has an open upper end and an open lower end. The open upper end of the lower portion 16 is integral with the open lower end of the intermediate portion 18. The open lower end of the lower portion 16 serves as a dispensing opening. In use, pills positioned within the compartments will be funneled out through the open lower end of the lower portion 16 into a person's hand or the like.

The plurality of release mechanisms 28 couple with the plurality of compartments of the upper portion 14 of the housing 12. Each of the release mechanisms 28 include a sliding panel 30 extending inwardly of the upper portion 14 immediately above the apertures 22 in the closed lower end. Each of the panels 30 have a spring 32 secured to an interior end thereof whereby the spring 32 urges the sliding panel 30 outwardly with respect to the housing 12. Each of the panels 30 have an aperture 34 therethrough for selectively aligning with the apertures 22 of the compartments when the panels 30 are pushed inwardly of the housing 12. Each of the sliding panels 30 have a handle 36 disposed on an exterior end thereof.

The plurality of inserts 38 are positionable within the plurality of compartments of the housing 12 above the sliding panels 30. The inserts 38 have apertures 40 of various sizes and shapes therethrough. The inserts 38 can be interchanged within the compartments to accommodate pills of varying sizes and shapes. The sliding panel 30 would be pushed inwardly so that the aperture 34 thereof aligns with the aperture 40 of the insert 38 thereby allowing the pills or vitamins to travel therethrough and funneled outwardly of the housing 12 through the open lower end of the lower portion 16.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the united states is as follows:

1. A vitamin and pill dispensing device for dispensing a predetermined quantity of vitamins and pills comprising, in combination:

a housing having an upper portion, a lower portion, and an intermediate portion therebetween, the upper portion having an open upper end, a closed lower end, a front face, a rear face, and a pair of opposed side walls, the upper portion having a plurality of divider panels extending between the closed lower end and the open upper end in a spaced relationship thereby separating the upper portion into a plurality of compartments, the closed lower end having a plurality of apertures therethrough whereby each aperture is disposed within one of each of the compartments, the open upper end having a cover member hingedly coupled thereto, the rear face having a pair of slotted apertures therethrough to facilitate securement of the housing a wall area, the intermediate portion having an inverted frustoconical configuration defined by an open upper end and an open lower end, the open upper end of the intermediate portion being integral with the closed lower end of the upper portion, the lower portion having an open upper end and an open lower end, the open upper end of the lower portion being integral with the open lower end of the intermediate portion, the open lower end of the lower portion serving as a dispensing opening;

a plurality of release mechanisms coupling with the plurality of compartments of the upper portion of the housing, each of the release mechanisms including a sliding panel extending inwardly of the upper portion immediately above the apertures in the closed lower end, each of the panels having a spring secured to an interior end thereof whereby the spring urges the sliding panel outwardly with respect to the housing, each of the panels having an aperture therethrough for selectively aligning with the apertures of the compartments when the panels are pushed inwardly of the housing, each of the sliding panels having a handle disposed on an exterior end thereof;

a plurality of inserts positionable within the plurality of compartments of the housing above the sliding panels, the inserts having apertures of various sizes and shapes therethrough.

2. A vitamin and pill dispensing device for dispensing a predetermined quantity of vitamins and pills comprising, in combination:

a housing having an upper portion, a lower portion, and an intermediate portion therebetween, the upper portion having an open upper end, a closed lower end, a front face, a rear face, and a pair of opposed side walls, the upper portion having a plurality of divider panels extending between the closed lower end and the open upper end in a spaced relationship thereby separating the upper portion into a plurality of compartments, the closed lower end having a plurality of apertures therethrough whereby each aperture is disposed within one of each of the compartments, the intermediate portion having an inverted frustoconical configuration defined by an open upper end and an open lower end, the open upper end of the intermediate portion being integral with the closed lower end of the upper portion, the lower portion having an open upper end and an open lower end, the open upper end of the lower portion being integral with the open lower end of the intermediate portion, the open lower end of the lower portion serving as a dispensing opening;

a plurality of release mechanisms coupling with the plurality of compartments of the upper portion of the housing.

3. The vitamin and pill dispensing device as set forth in claim 2 wherein the open upper end of the upper portion of the housing has a cover member hingedly coupled thereto.

4. The vitamin and pill dispensing device as set forth in claim 2 wherein the rear face of the upper portion of the housing has a pair of slotted apertures therethrough to facilitate securement of the housing a wall area.

5. The vitamin and pill dispensing device as set forth in claim 2 wherein each of the release mechanisms includes a sliding panel extending inwardly of the upper portion immediately above the apertures in the closed lower end, each of the panels having a spring secured to an interior end thereof whereby the spring urges the sliding panel outwardly with respect to the housing, each of the panels having an aperture therethrough for selectively aligning with the apertures of the compartments when the panels are pushed inwardly of the housing, each of the sliding panels having a handle disposed on an exterior end thereof.

6. The vitamin and pill dispensing device as set forth in claim 2 and further including a plurality of inserts positionable within the plurality of compartments of the housing above the release mechanisms, the inserts having apertures of various sizes and shapes therethrough.

* * * * *